US012663819B2

(12) United States Patent
Baik et al.

(10) Patent No.: US 12,663,819 B2
(45) Date of Patent: Jun. 23, 2026

(54) UNMANNED VEHICLE MONITORING APPARATUS AND METHOD

(71) Applicant: ELECTRONICS AND TELECOMMUNICATIONS RESEARCH INSTITUTE, Daejeon (KR)

(72) Inventors: Seyoung Baik, Daejeon (KR); Sangwook Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 248 days.

(21) Appl. No.: 18/426,543

(22) Filed: Jan. 30, 2024

(65) Prior Publication Data

US 2025/0060755 A1 Feb. 20, 2025

(30) Foreign Application Priority Data

Aug. 16, 2023 (KR) ........................ 10-2023-0106983

(51) Int. Cl.
| | |
|---|---|
| *G05D 1/86* | (2024.01) |
| *G07C 5/08* | (2006.01) |
| *B64D 45/00* | (2006.01) |
| *B64U 70/83* | (2023.01) |
| *G05D 1/617* | (2024.01) |

(Continued)

(52) U.S. Cl.
CPC ............. *G05D 1/86* (2024.01); *G07C 5/0808* (2013.01); *G07C 5/085* (2013.01); *B64D 2045/0065* (2013.01); *B64D 2045/0085*

(2013.01); *B64U 70/83* (2023.01); *G05D 1/617* (2024.01); *G05D 2109/20* (2024.01); *G05D 2111/30* (2024.01)

(58) Field of Classification Search
None
See application file for complete search history.

(56) References Cited

U.S. PATENT DOCUMENTS

| | | | | |
|---|---|---|---|---|
| 10,733,894 B1 * | 8/2020 | Beard | ................... | G01C 21/20 |
| 11,485,501 B2 | 11/2022 | Na et al. | | |

(Continued)

FOREIGN PATENT DOCUMENTS

| | | | |
|---|---|---|---|
| CN | 217694078 U | * | 10/2022 |
| KR | 10-2018-0015985 A | | 2/2018 |

(Continued)

OTHER PUBLICATIONS

Translation of CN 217694078 (Year: 2022).*
Translation of KR 20190040958 (Year: 2019).*

*Primary Examiner* — Peter D Nolan
*Assistant Examiner* — Michael F Whalen
(74) *Attorney, Agent, or Firm* — LRK PATENT LAW FIRM

(57) ABSTRACT

Disclosed herein are an unmanned vehicle monitoring apparatus and method. The unmanned vehicle monitoring apparatus may include a safety device including at least one of a parachute or an additional wing, or a combination thereof, and a multi-functional data recording module configured to monitor a flight state of an unmanned vehicle to detect an anomaly, control driving of the safety device according to an anomaly detection result, and record flight status data of the unmanned vehicle in a memory.

16 Claims, 7 Drawing Sheets

(51) Int. Cl.
   *G05D 109/20*        (2024.01)
   *G05D 111/30*        (2024.01)

(56)                References Cited

U.S. PATENT DOCUMENTS

| | | | | |
|---|---|---|---|---|
| 2016/0189548 A1* | 6/2016 | Thurling | ................. | G08G 5/55 |
| | | | | 701/3 |
| 2017/0106986 A1* | 4/2017 | Sweeny | ................. | B64U 70/83 |
| 2018/0050805 A1* | 2/2018 | Kalinka | ................. | B64D 17/72 |
| 2019/0251764 A1* | 8/2019 | Wang | ................. | G06F 16/2282 |

FOREIGN PATENT DOCUMENTS

| | | | | | |
|---|---|---|---|---|---|
| KR | 20190040958 A | * | 4/2019 | .......... | G07C 5/0866 |
| KR | 10-2048798 B1 | | 11/2019 | | |
| KR | 10-2287426 B1 | | 8/2021 | | |
| WO | 2016/026023 A1 | | 2/2016 | | |

\* cited by examiner

110

UNMANNED VEHICLE MONITORING APPARATUS AND METHOD

CROSS REFERENCE TO RELATED APPLICATION

This application claims the benefit of Korean Patent Application No. 10-2023-0106983, filed Aug. 16, 2023, which is hereby incorporated by reference in its entirety into this application.

BACKGROUND OF THE INVENTION

1. Technical Field

The present disclosure relates generally to technology for monitoring an unmanned vehicle and storing monitored data.

2. Description of Related Art

A transportation means such as a car or an aircraft has a data recording device (i.e., a black box) mounted thereon for accident prevention and investigation. However, the concept of data recording devices varies depending on the transportation means, and thus it is not easy to apply the same operation to all kinds of transportation means.

For example, for a car, a micro SD card is used for accident investigation with a focus on data based on images and speech, and for an aircraft, input data values from a pilot and flight data inside/outside the body of the aircraft by linking a flight data recorder (FDR) and a cockpit voice recorder with a separate high-capacity disk.

Meanwhile, an unmanned vehicle, which moves by remote control without human boarding, such as an unmanned aerial vehicle (UAV), a drone, or a robot is in a situation where there is a lack of definition and foundational technology regarding a data recording device. Accordingly, there is a need for a multi-functional data recording device in a form that not only a data recording device for accident investigation on an unmanned vehicle, but also an accident prevention device are combined.

In addition, an unmanned vehicle in general stores flight data and media data in a micro SD card mounted inside the flight body. In this way, the unmanned vehicle performs a function of the data recording device only depending on all the flight data stored in the micro SD card. In this case, when the SD card is damaged or lost, all the recorded information disappear, which results in difficulty in investigating accidents. Furthermore, even when the SD card is preserved, there is not another data storage device suitable for verification or comparison, which lowers the reliability. As a result, accidents are on the rise due to the increasing demand for drones, but there is a lack of measures or supporting documentation to analyze flight data for actual accident settlement such as insurance claims.

In addition, because it is easy to acquire data of an unmanned vehicle after accident, there is a concern about leakage of personal information about an owner of the unmanned vehicle or key data of national public institutions.

However, currently released unmanned vehicles vary in their structure, running software, and interface methods, and thus their data recording functions or accident prevention functions also require to be newly developed or upgraded to be suitable for each of various unmanned vehicles. But this is not actually feasible.

SUMMARY OF THE INVENTION

An embodiment is intended to provide a multi-functional data recording function in a form that not only a data recording for accident investigation on an unmanned vehicle, but also an accident prevention function are combined.

An embodiment is intended to assist in accident investigation by securing data of an unmanned vehicle, even when a recording means inside the unmanned vehicle is damaged or lost.

An embodiment is intended to assist in accurately identifying the causes of accidents by verifying the accuracy of the flight data or whether flight data stored in an unmanned vehicle is true.

An embodiment is intended to prevent leakage of personal information or key data of national public institutions from data after an accident of an unmanned vehicle.

An embodiment is intended to make it possible to add, to an unmanned vehicle, various functions including a data recording function and an accident prevention function regardless of the structure, software, an interface method and the like.

In accordance with an aspect of the present disclosure, there is provided an unmanned vehicle monitoring apparatus including a safety device including at least one of a parachute or an additional wing, or a combination thereof; and a multi-functional data recording module configured to monitor a flight state of an unmanned vehicle to detect an anomaly, control driving of the safety device according to an anomaly detection result, and record flight status data of the unmanned vehicle in memory.

The multi-functional data recording module may be configured such that a housing is attached to a portion of the unmanned vehicle and such that the housing includes an internal housing made of an electromagnetic interference shield material and an external housing made of a crash protection material.

The multi-functional data recording module may be configured to, in detecting the anomaly, generate an emergency signal in case of occurrence of at least one of detection of a radio interference signal, detection of whether an operation value is lost, power shortage detection, Electronic Speed Controller (ESC) motor abnormality detection, body anomaly detection, heartbeat signal detection, failure detection including a watchdog signal, or crash detection through attitude control calculation, or a combination thereof, during flight.

The multi-functional data recording module may include at least one sensor configured to sense each of a GPS signal, an altitude, a location, and a flight control unit configured to perform control calculation for flight based on sensing information from the at least one sensor, wherein the anomaly is detected using a result of the control calculation by the flight control unit.

The multi-functional data recording module may further include an RF unit, wherein the emergency signal is transmitted to an external operator device through the RF unit according to an anomaly detecting result, and the safety device is driven in response to reception of an emergency operation command from the external operator device through the RF unit.

The multi-functional data recording module may track a location of the unmanned vehicle to report the location to the operator device at a preset interval when the emergency operation command from the external operator device is not received through the RF unit.

The unmanned vehicle monitoring apparatus may further include a remote identification sensor configured to receive the remote identification information broadcasted from at least one additional unmanned vehicle and input the remote identification information to the multi-functional data recording module.

The multi-functional data recording module may collect data generated before, during, and after flight of the unmanned vehicle at a preset interval, encrypt the data, and store the encrypted data in the memory.

The multi-functional data recording module may perform location tracking, data encryption, and data distribution service (DDS)-based user authentication through post-flight analysis, and then use a data extraction function to analyze an accident.

The multi-functional data recording module may include a relay circuit connected with wings of the unmanned vehicle to stop driving of the wings of the unmanned vehicle through the relay circuit upon generation of an emergency signal, and drive the safety device.

In accordance with another aspect of the present disclosure, there is provided an unmanned vehicle monitoring method, including monitoring a flight state of an unmanned vehicle to detect an anomaly, wirelessly transmitting an emergency signal to an external operator device according to an anomaly detection result, controlling driving of a safety device in response to reception of an emergency operation command from the external operator device, and reporting, to the external operator device, a landing state of the unmanned vehicle in response to detection of landing of the unmanned vehicle.

Detecting the anomaly may include generating an emergency signal in case of occurrence of at least one of detection of a radio interference signal, detection of whether an operation value is lost, power shortage detection, ESC motor abnormality detection, body anomaly detection, heartbeat signal detection, failure detection including a watchdog signal, or crash detection through attitude control calculation, or a combination thereof, during flight.

The unmanned vehicle monitoring method may further include performing control calculation for the flight based on sensing information from at least one sensor configured to sense each of a GPS signal, an altitude, and a location, wherein detecting anomaly includes detecting the anomaly using a result of the control calculation for the flight.

The unmanned vehicle monitoring method may further include tracking a location of the unmanned vehicle to report the location to the operator device at a preset interval when the emergency operation command from the external operator device is not received.

The unmanned vehicle monitoring method may further include receiving remote identification information broadcasted from at least one additional unmanned vehicle.

The unmanned vehicle monitoring method may further include collecting data generated before, during, and after flight of the unmanned vehicle at a preset interval, encrypting the data, and storing the encrypted data in memory.

The unmanned vehicle monitoring method may further include performing location tracking, data encryption, and data distribution service (DDS)-based user authentication through post-flight analysis, and then analyzing an accident using a data extraction function.

Controlling driving of the safety device may include, when a relay circuit connected with wings of the unmanned vehicle is included, stopping the driving of the wings of the unmanned vehicle through the relay circuit upon generation of the emergency signal.

4

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
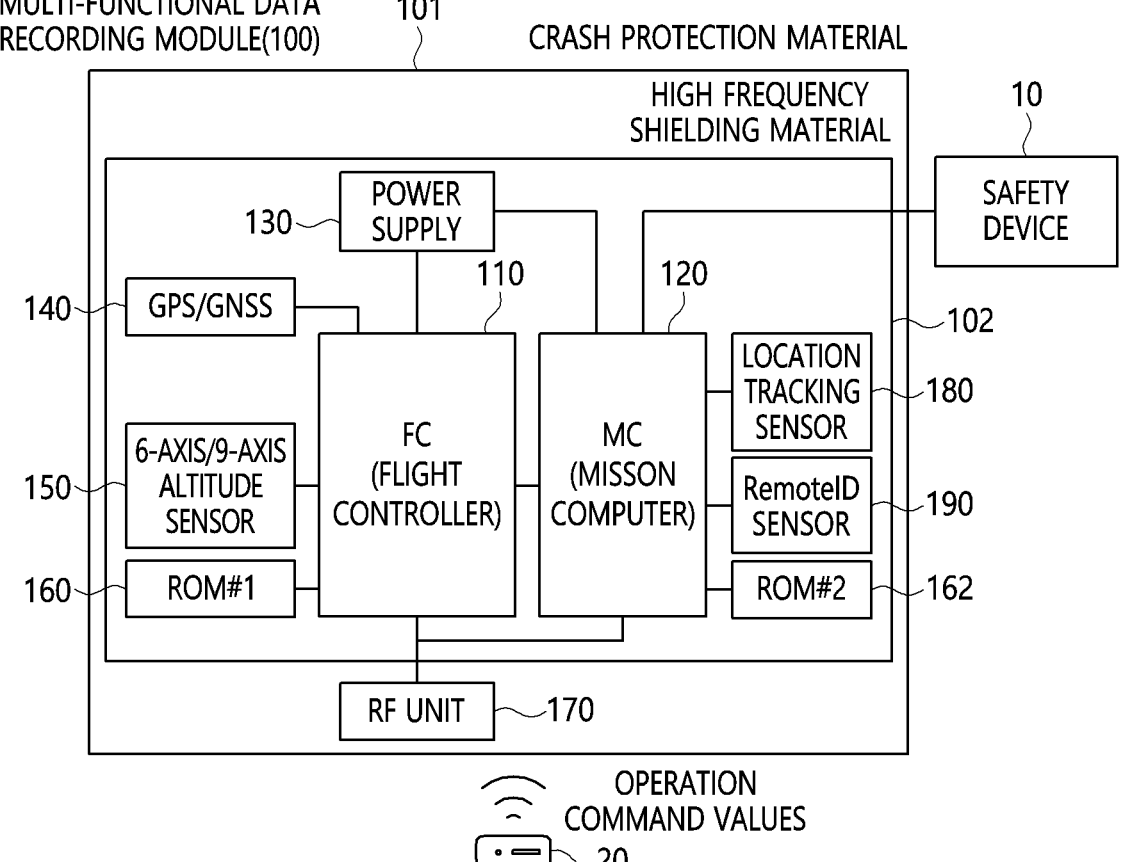
FIG. 1 is a configuration diagram of an unmanned vehicle monitoring apparatus according to an embodiment.

Advantages and features of the present disclosure and methods for achieving the same will be clarified with reference to embodiments described later in detail together with the accompanying drawings. However, the present disclosure is capable of being implemented in various forms, and is not limited to the embodiments described later, and these embodiments are provided so that this disclosure will be thorough and complete and will fully convey the scope of the present disclosure to those skilled in the art. The present disclosure should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present disclosure.

The terms used in the present specification are merely used to describe embodiments, and are not intended to limit the present disclosure. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present disclosure pertains. Further, terms defined in generally used dictionaries are not to be interpreted as having ideal or excessively formal meanings unless they are definitely defined in the present specification.

An embodiment described herein proposes an unmanned vehicle monitoring apparatus and method for providing a multi-functional data recording function in a form that not only a data recording function for accident investigation on an unmanned vehicle but also an accident prevention function are combined.

The unmanned vehicle monitoring apparatus according to the described embodiment may be configured in a form that a separate module including various functions including a data recording function and an accident prevention function is provided to be mounted on the unmanned vehicle regardless of the structure, software, and an interface method of the unmanned vehicle. In other words, just by applying an additional module without modifying the software and structure, the unmanned vehicle monitoring apparatus may serve as a black box of the unmanned vehicle. As a result, the unmanned vehicle monitoring apparatus may be applied to an open source-based unmanned vehicle or a commercial unmanned vehicle.

Such an embodiment is conceived with the idea that an additional module is required to be mounted on an unmanned vehicle in order to perform the forgoing functions as it becomes mandatory to implement a remote identification function (remoteID) of the Federal Aviation Administration (FAA). In other words, in the embodiment, the additional module required to be mounted on the unmanned vehicle is not limited to just being used as the remote identification function, but functions such as failure detection, accident response and the like as well as data recording for accident investigation are added to contribute to safety enforcement and accident prevention.

FIG. 1 is a configuration diagram of an unmanned vehicle monitoring apparatus according to an embodiment.

Referring to FIG. 1, the unmanned vehicle monitoring apparatus according to an embodiment may be configured to include a safety device 10, an operator device 20, and a multi-functional data recording module 100.

The safety device 10 may include at least one of a parachute, an additive wing or a combination thereof. These may be urgently driven according to an anomaly of the unmanned vehicle to prevent the unmanned vehicle from crashing to reduce the extent of damage. Namely, in case of an accident, the unmanned vehicle is guided to land or open up the parachute through a flight conversion function to reduce the extent of accident.

The operator device 20 may be owned by an operator for remotely controlling the multi-functional data recording module 100 attached to the unmanned vehicle, and a mobile application functioning as a dedicated monitoring ground control system (GCS) may be installed therein. Namely, the operator device 20 enables monitoring through its own GCS function even without using a GCS of the unmanned vehicle.

Here, as the operator device 20, all devices including a mobile phone owned by the operator are possible which are capable of communication.

The multi-functional data recording module 100 may perform operations of monitoring the flight status of the unmanned vehicle to detect an anomaly, driving to control the safety device 10 based on a result of the anomaly detection, and recording flight status data of the unmanned vehicle in memories 160 and 162. Through this, the safety may be enforced through cyber security and emergency preparedness throughout the entire flight cycle including before, during, and after the accident and the like of the unmanned vehicle.

Here, the multi-functional data recording module 100 has a separate hardware structure from the unmanned vehicle as described above, and thus a housing may be attached to a portion of the unmanned vehicle. Through this, the multi-functional data recording module 100 may be applied to various types and structures of unmanned vehicles.

In addition, the housing may have a double structure including an external housing 101 made of a crash protection material and an internal housing 102 made of an electromagnetic interference (EMI)-shielding material. Namely, the housing may be made of an aircraft-grade crash protection material, and thus even when an accident like a crash occurs in the unmanned vehicle, the multi-functional data recording module 100 may be prevented from being damaged to preserve the flight status data recorded in the memories 160 and 162. In addition, a high frequency shielding material may be prepared for frequency attacks such as GPS spoofing.

Specifically, the multi-functional data recording module 100 may include, in the housing, a flight controller (FC) 110, a mission computer (MC) 120, a power supply 130, a GPS signal detector 140, a 6-axis/9-axis altitude sensor 150, the memories 160 and 162, an RF unit 170, a location tracking sensor 180, and a remote identification (remoteID) sensor 190.

The FC 110 may perform attitude control calculations and sensor data storage for flight based on sensing information transferred from at least one 6-axis/9-axis altitude sensor 150.

Namely, the FC 110 does not actually control the flight of the unmanned vehicle, but may calculate control values based on various sensing information from the unmanned vehicle in order to monitor the flight status of the unmanned vehicle and transfer the control values to the MC 120. Accordingly, the MC 120 may monitor the unmanned vehicle from the viewpoint of a supervisor even without directly interfacing with an actual flight controller of the unmanned vehicle.

However, the MC 120 may be interfaced with the actual flight controller of the unmanned vehicle according to an embodiment and also use together data acquired from the actual flight controller of the unmanned vehicle to perform various functions.

The MC 120 interacts with elements of the multi-functional data recording module 100 to perform an overall operational control of the multi-functional data recording module 100. Detailed description thereof will be provided below with reference to FIGS. 2 to 8.

Here, the FC 110 and the MC 120 are semiconductor devices for executing programs or processing instructions stored in the memories 160 and 162.

The remote identification sensor 190 may receive remote identification information broadcasted from at least one additional unmanned vehicle to transfer the same to the MC 120. Namely, the remote ID sensor 190 may assist in the remote ID function that satisfies the criterions of the US FAA and ASTM F3411-19.

The power supply 130 may supply power to the multi-functional data recording module 100 even in an emergency with a separate power supply that is different from the power supply of the unmanned vehicle.

The memories 160 and 162 may store data obtained by monitoring in multi-functional data recording module 100 over the entire cycle including before the flight, during the flight, after the flight and the like of the unmanned vehicle. As shown in FIG. 1, the memories 160 and 162 may be connected respectively to the FC 110 and the MC 120, or be integrated into one memory.

Here, data stored in the memories 160 and 162 may include flight logs (attitude, location, altitude, speed or the like), media data, and command values (control plane or GCS values). In addition, such data may be collected at a preset interval, and be encrypted to be stored.

The RF unit 170 may transfer various signals including emergency signals transferred from the MC 120 to the operator device 20, and receive operation command values from the operator device 20 to transfer the same to the MC 120.

The location tracking sensor 180 is to track the location of the unmanned vehicle, and may execute a tracking function through a separate communication technique (e.g., LongRange BLE, Lo-Ra or the like). Through this, the MC 120 may track the location of the unmanned vehicle at a preset interval to report the tracking result to the operator device 20 even when not receiving an emergency operation execution command from the operator device 20 in emergency.

Figure 2:
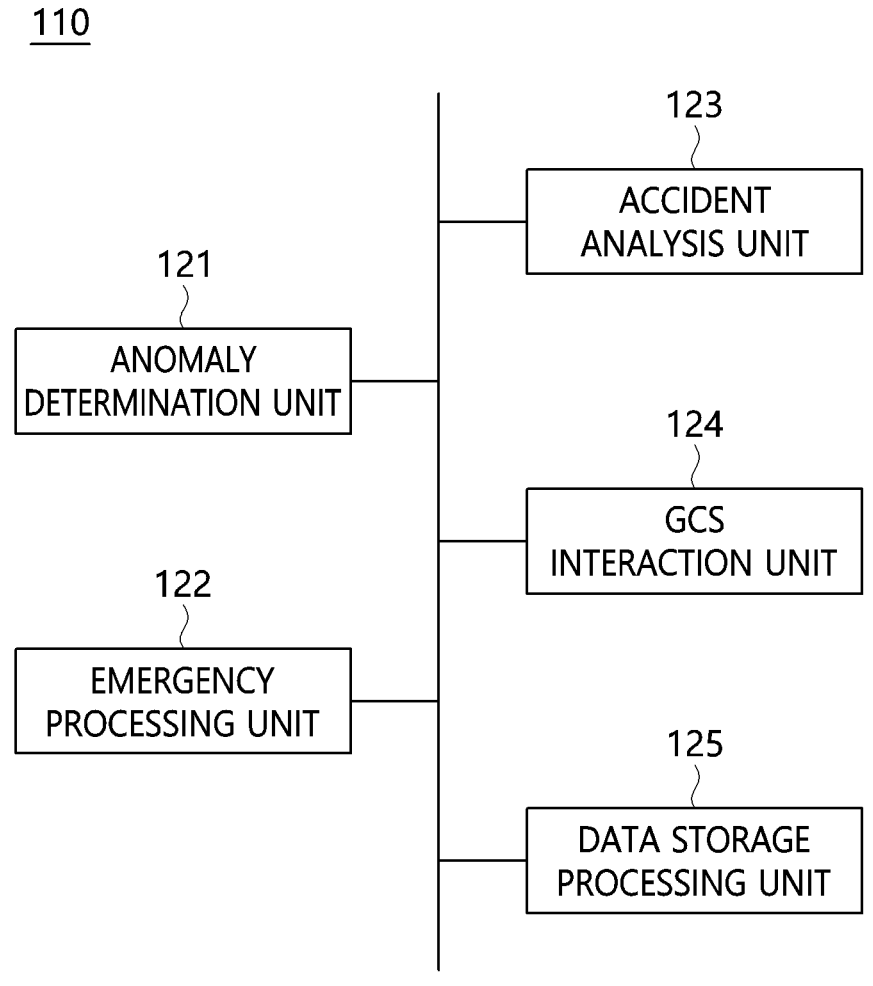
FIG. 2 is a schematic functional block diagram of a mission computer according to an embodiment.

FIG. 2 is a schematic functional block diagram of the MC according to an embodiment.

Referring to FIG. 2, the MC 120 may roughly include an anomaly determination 121, an emergency processing unit 122, an accident analysis unit 123, a GCS interaction unit 124, and a data storage processing unit 125.

First, the anomaly determination unit 121 may detect an anomaly of the unmanned vehicle through an anomaly determination algorithm based on artificial intelligence learning and generate an emergency signal. In other words, in detecting the anomaly of the unmanned vehicle, the emergency signal may be generated in case of occurrence, of at least one of detection of radio interference signals, detection of whether operation values are lost, power shortage detection, Electronic Speed Controller (ESC) motor abnormality detection, detection of a body anomaly, heartbeat signal detection, failure detection including a watchdog signal, or crash detection through attitude control calculation, or a combination thereof, during flight.

Here, the anomaly determination unit 121 may detect the anomaly by using information acquired from an actual unmanned vehicle or a control calculation result from the FC 110 to detect an anomaly.

Here, the anomaly determination may be performed through cross validation by three methods including emergency commands of a system perspective, an operational perspective, and a user, and accordingly, the emergency signal may be generated.

Figure 3:
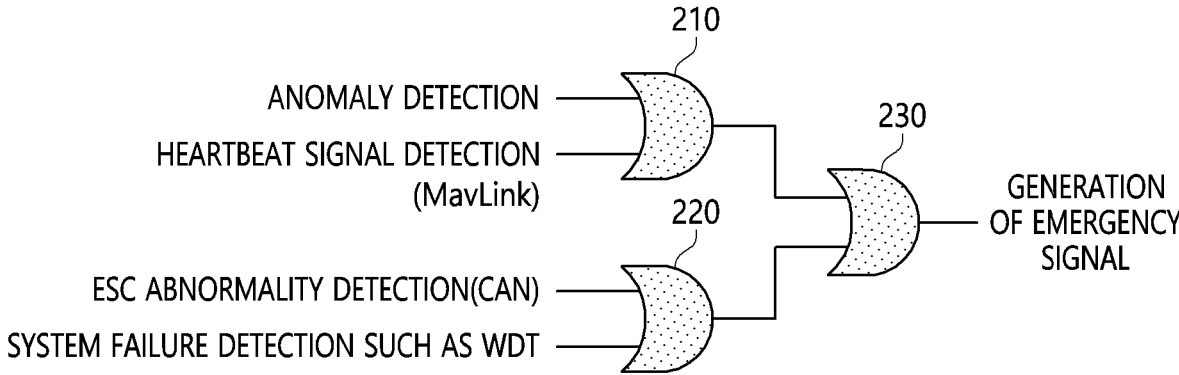
FIG. 3 is a logic circuit diagram for explaining anomaly determination in the perspective of a system according to an embodiment.

FIG. 3 is a logic circuit diagram for explaining the anomaly determination in the system perspective according to an embodiment.

In detection through the anomaly determination algorithm in the system perspective according to an embodiment, the anomaly determination unit 121 may perform at least one of body state confirmation through the heartbeat communication via the Mavlink protocol, ESC motor value failure detection using DoneCAN and serial data, or failure detection signal check including the watchdog signals, or a combination thereof.

Namely, referring to FIG. 3, the anomaly determination unit 121 may output '1' in response to an input of at least one of an anomaly detection signal or a heartbeat signal detection signal, or a combination thereof through a NOR gate 210, output '1' in response to an input of at least one of an ESC abnormality detection signal or a system failure detection signal, or a combination thereof through a NOR gate 220, and generate the emergency signal in response to an input of '1' from at least one of the NOR gate 210 or the NOR gate 220, or a combination thereof through a NOR gate 230.

Figure 4:
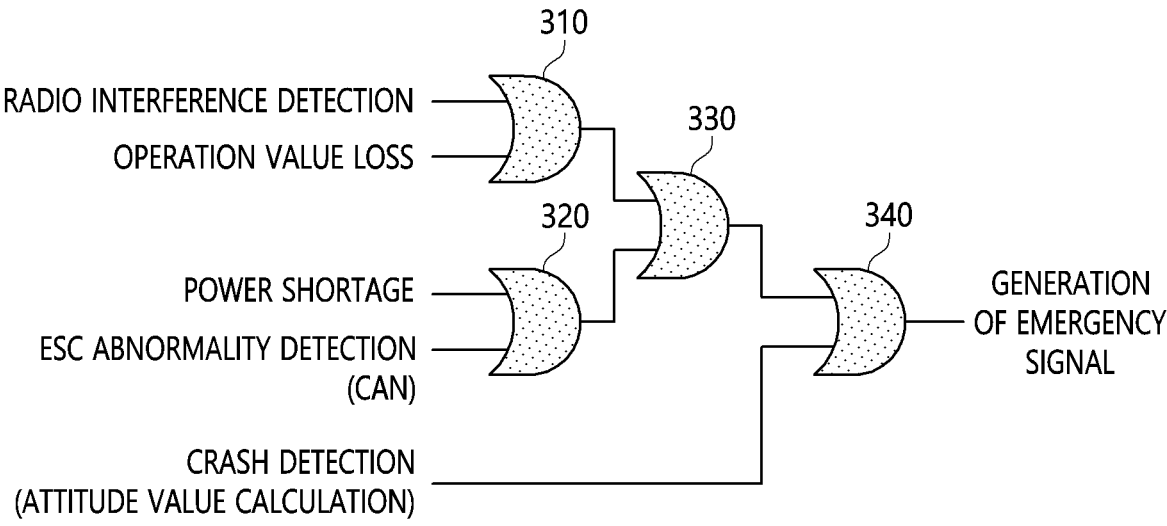
FIG. 4 is a logic circuit diagram for explaining anomaly determination from the perspective of an operation according to an embodiment.

FIG. 4 is a logic circuit diagram for explaining the anomaly determination from the system perspective according to an embodiment.

In detection through the anomaly determination algorithm in the operation perspective according to an embodiment, the anomaly determination unit 121 may perform at least one among the radio interference signal detection, data loss between the unmanned vehicle and operation (command), power shortage, ESC motor abnormality detection, attitude control calculation or the like.

Namely, referring to FIG. 4, the anomaly determination unit 121 may output '1' in response to an input of at least one of the radio interference signal or the operation value loss signal, or a combination thereof through a NOR gate 310, output '1' in response to an input of at least one of a power shortage signal or the ESC abnormality detection signal, or a combination thereof through a NOR gate 320, output '1' when one of the output values of the NOR gate 310 and the NOR gate 320 is '1', and generate the emergency signal when the output value of the NOR gate 330 is '1' or the crash detection signal is input.

Referring to FIG. 2 again, the emergency processing unit 122 may perform a safety and emergency response function corresponding to an anomaly detection result from the anomaly determination unit 121.

Here, the emergency processing unit 122 may drive the GCS interaction unit 124 using the emergency signal generated from the anomaly determination unit 121 to perform an emergency process through interaction with the operator device 20.

The GCS interaction unit 124 may transmit the emergency signal to an external operator device 20 through the RF unit 170 and receive an emergency operation command from the external operator device 20 through the RF unit 170.

In addition, the emergency processing unit 122 may drive the safety device 10 in response to the generation of the emergency signal from the anomaly determination unit 121. Here, two embodiments may be executed depending on a compatibility platform with the unmanned vehicle.

Figure 5:
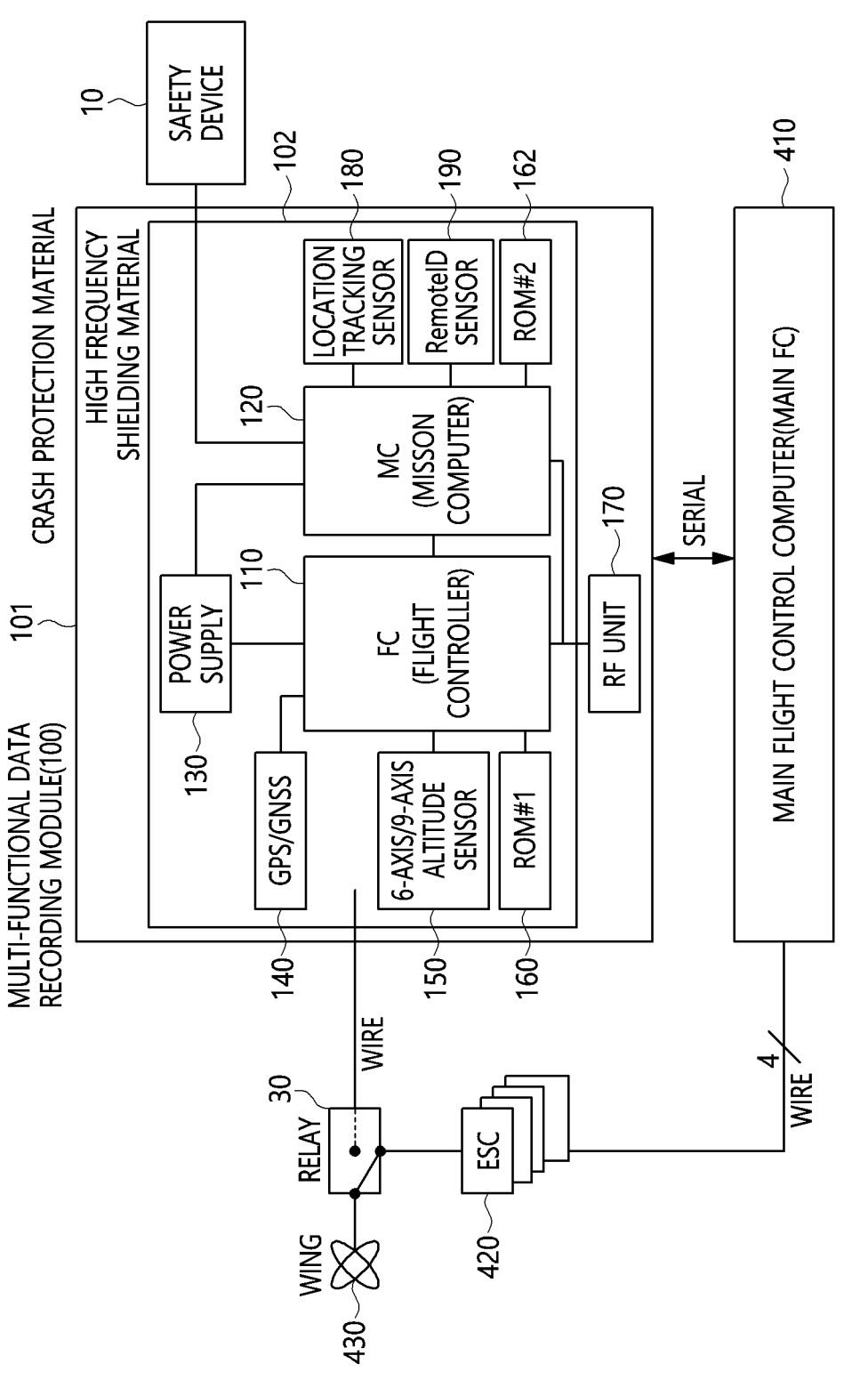
FIG. 5 is an example diagram in which an unmanned vehicle monitoring device is applied to an open source-based unmanned vehicle according to an embodiment.

FIG. 5 is an example diagram in which the unmanned monitoring device is applied to an open source-based unmanned vehicle.

Referring to FIG. 5, when the unmanned vehicle monitoring apparatus 100 is applied to an open source-based drone compatible platform unmanned vehicle, the unmanned vehicle monitoring apparatus 100 may further include a relay circuit 30 connected to the wings 430 of the unmanned vehicle.

Accordingly, the emergency processing unit 122 of the MC 120 may stop driving of the wings 430 connected to the main flight control computer 410 of the unmanned vehicle through the relay circuit 30 at the time of emergency signal generation, and drive the safety device 10. In other words, according to the emergency signal generation, the emergency processing unit 122 may stop the previous control for the wings 430 and converts to a safety procedure such as parachute deployment, an autonomous flight function and the like.

Figure 6:
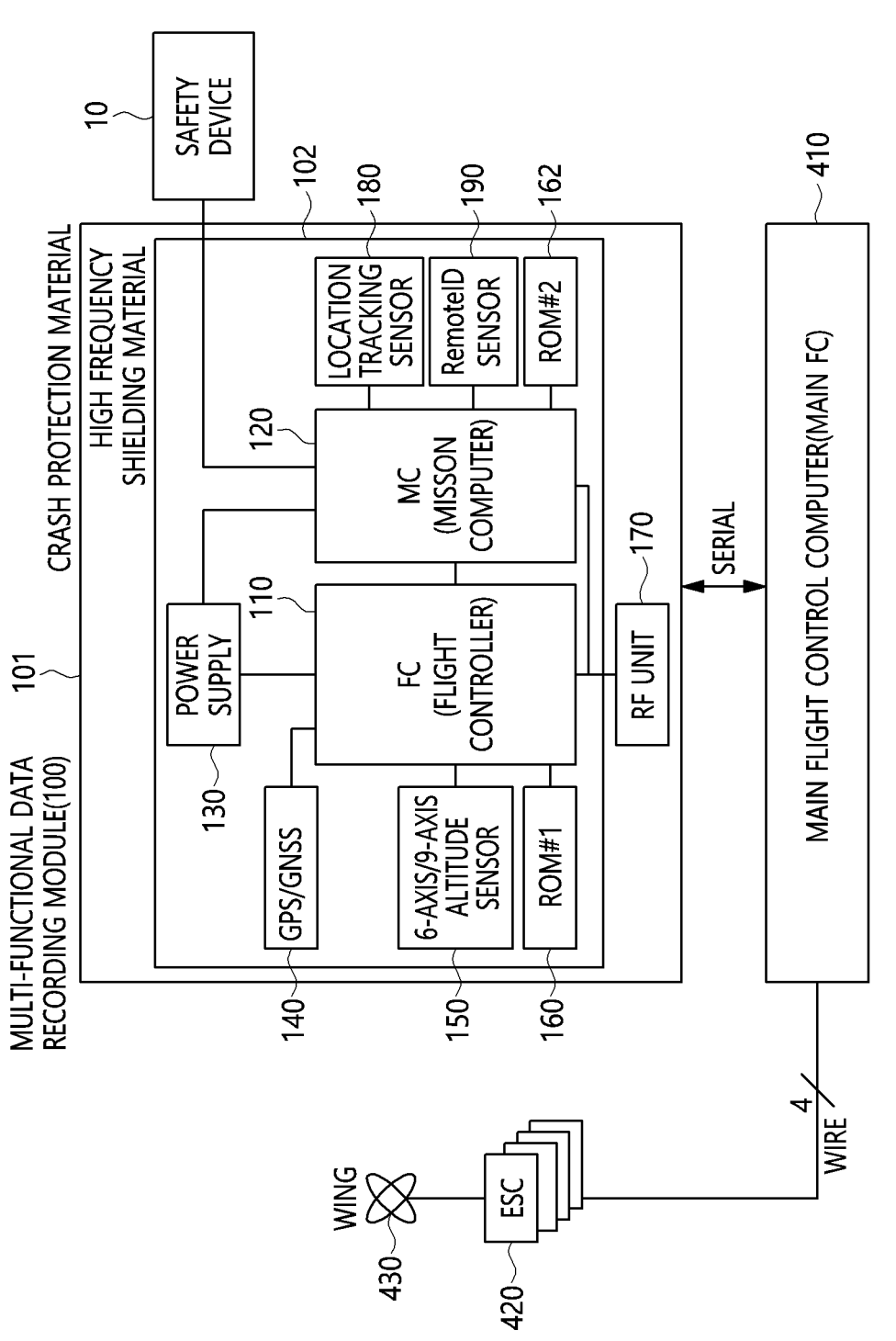
FIG. 6 is an example diagram in which an unmanned vehicle monitoring device is applied to a commercial unmanned vehicle according to another embodiment.

FIG. 6 is an example diagram in which the unmanned monitoring apparatus is applied to a commercial unmanned vehicle according to another embodiment.

Referring to FIG. 6, when being applied to a commercial unmanned vehicle, namely, not being able to communicate with the unmanned vehicle, the unmanned vehicle monitoring apparatus 100 operates only in an attached form.

Accordingly, the emergency processing unit 122 of the MC 120 may drive the safety device 10 at the time of the emergency signal generation regardless of whether the wings 430 connected with the main flight control computer 410 of the unmanned vehicle are driven. In other words, according to the emergency signal generation, the emergency processing unit 122 may convert, through the safety device 10, to the safety procedure such as the parachute deployment, the autonomous flight function and the like even when the wings 430 were previously driven.

Meanwhile, referring to FIG. 2 again, when not receiving the emergency operation command from the external operator device 20 through the RF unit 170, the GCS interaction unit 123 of the MC 120 may track the location of the unmanned vehicle through the location tracking sensor 180 to report a tracking result to the operator device 20 at a preset interval.

The data storage processing unit 125 may collect data generated before, during, and after flight of the unmanned vehicle at a preset interval, encrypt the collected data and store the encrypted data in the memories 160 and 162.

Here, the data may include flight logs (attitude, location, altitude, speed or the like), media data, or GCS command values from the operator device 20. In addition, the data may further include remote identification (RemoteID) transmission or reception values, tracking status values such as takeoff and landing states, loss or the like.

Here, the data may be automatically deleted after a certain time elapses after the emergency signal reception.

The accident analysis unit 123 may perform location tracking, data encryption, and data distribution service (DDS)-based user authentication through post-flight analysis, and then use a data extraction function to analyze an accident. Through this, it is possible to allow data access only to a certified institution to prevent the leakage of personal and key information.

Figure 7:
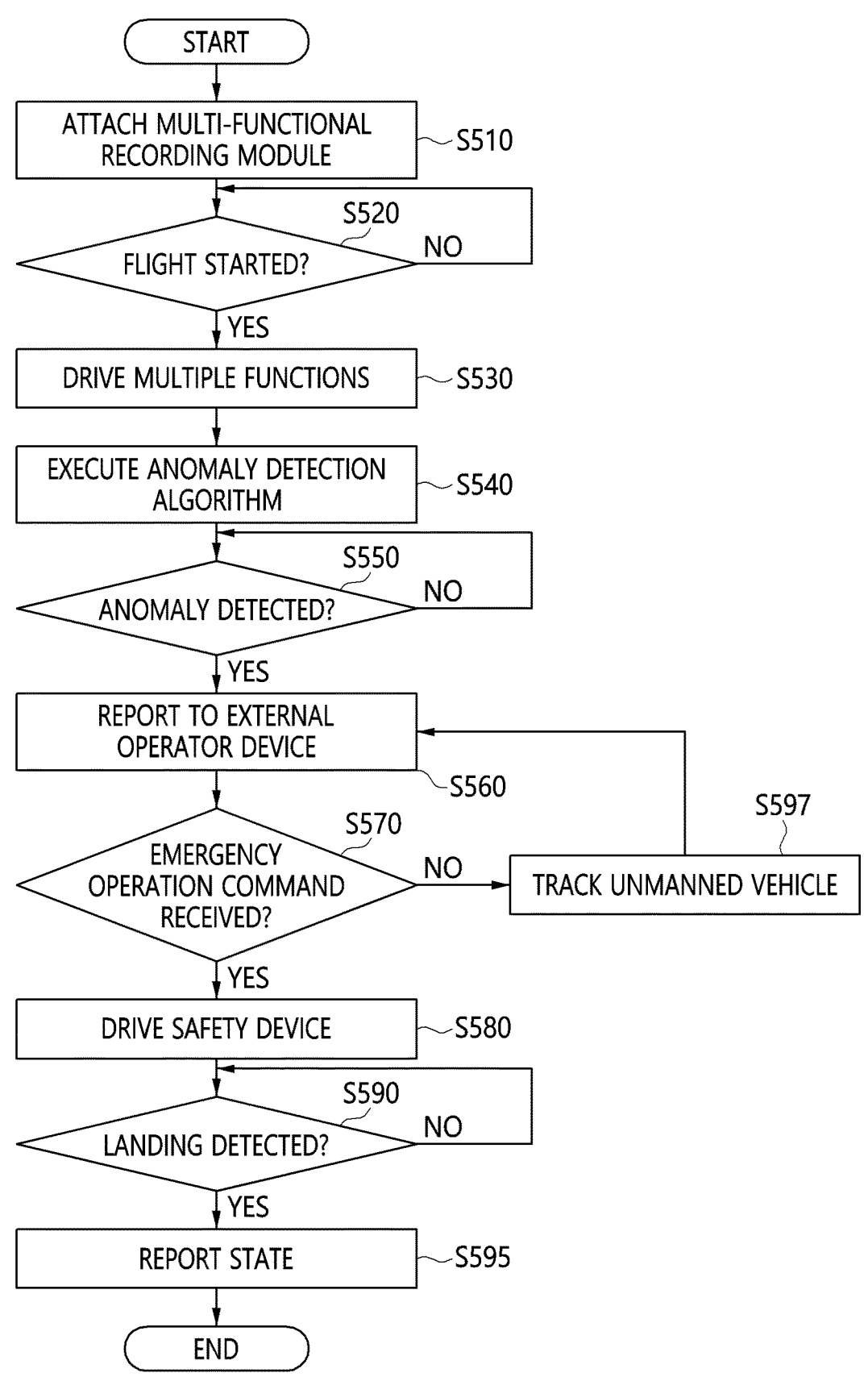
FIG. 7 is a flowchart for explaining an unmanned vehicle monitoring method according to an embodiment.
Figure 8:
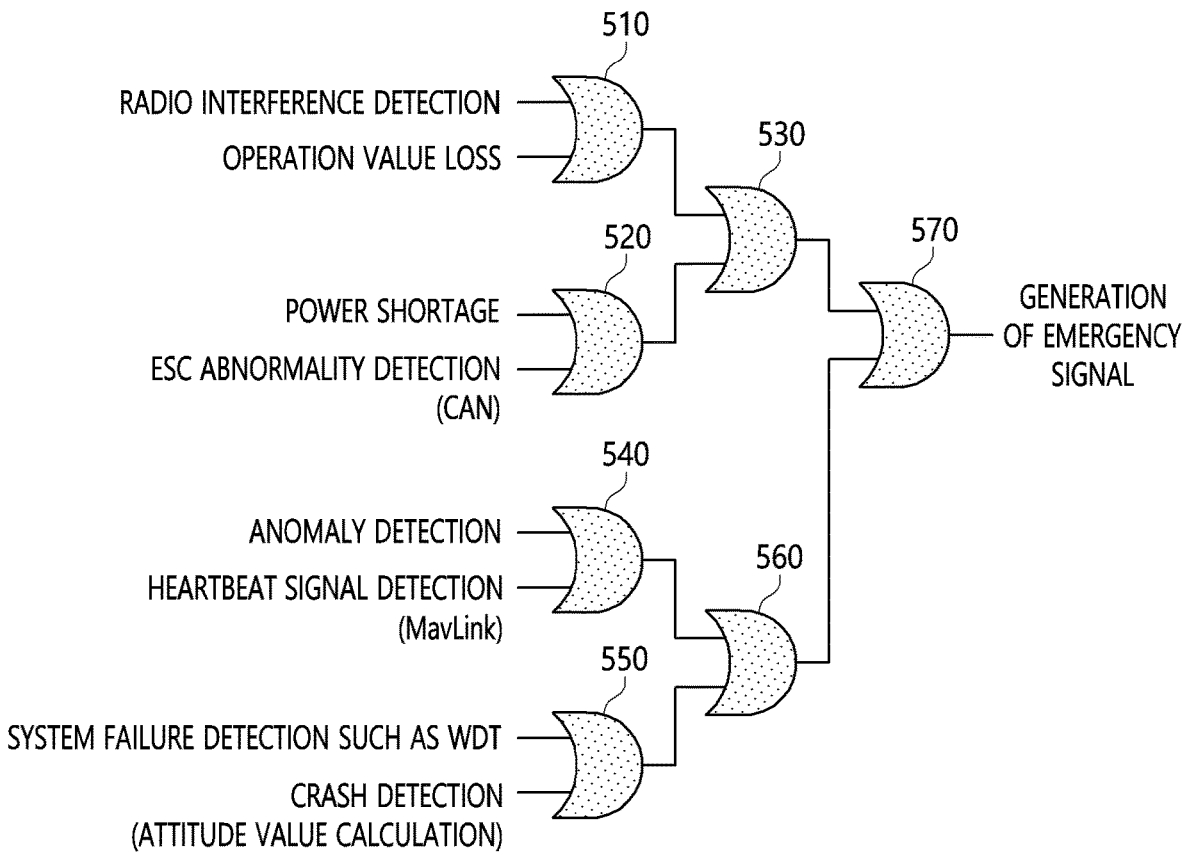
FIG. 8 is a logic circuit diagram for explaining anomaly determination according to an embodiment.

FIG. 7 is a flowchart for explaining an unmanned vehicle monitoring method according to an embodiment, and FIG. 8 is a logic circuit diagram for explaining anomaly determination according to an embodiment.

Referring to FIG. 7, the unmanned vehicle monitoring method according to an embodiment may include step S540 of monitoring a flight status of the unmanned vehicle to detect an anomaly, steps S550 and S560 of wirelessly transmitting an emergency signal to the external operator device according to an anomaly detection result, steps S570 and S580 of controlling the driving of the safety device 10 in response to reception of the emergency operation command from the external operator device 20, and steps S590 and S595 of reporting, to the external operator device 20, a landing state of the unmanned vehicle according to detection of the landing of the unmanned vehicle.

Prior to performing step S540 according to the embodiment, first, it is required to attach the multi-functional data recording module 100 to the unmanned vehicle at step S510, and then perform a calibration between the sensors of the unmanned vehicle and the sensors of the multi-functional data recording module 100, and set the GCS for interaction with the operator device 20.

Then, if flight starts upon take-off at step S520, the functions of all the elements included in the multi-functional data recording module 100 are activated at step S530.

Here, at step S550 of detecting an anomaly, an emergency signal may be generated in case of occurrence of at least one of detection of radio interference signals, detection of whether operation values are lost, power shortage detection, ESC motor abnormality detection, detection of a body anomaly, heartbeat signal detection, failure detection including a watchdog signal, or crash detection through attitude control calculation, or a combination thereof, during flight.

Here, the unmanned vehicle monitoring method according to an embodiment may further include the step of performing control calculation for the flight based on sensing information from at least one sensor that senses each of the GPS signal, the altitude, and the location, wherein, at step S540 of sensing an anomaly, the anomaly may be detected using the result of the control calculation for flight.

Here, at step S580 of controlling the driving of the safety device 10, when the relay circuit connected with the wings of the unmanned vehicle is included, the driving of the wings of the unmanned vehicle may be stopped through the relay circuit in emergency signal generation.

Here, the unmanned vehicle monitoring method according to an embodiment may further include step S597 of tracking the location of the unmanned vehicle to report the location to the operator device at a preset interval when the emergency operation command from the external operator device 20 is not received at step S570.

Here, the unmanned monitoring method may further include the step (not illustrated) of receiving the remote identification information broadcasted from at least one additional unmanned vehicle.

Here, the unmanned vehicle monitoring method may further include the step (not illustrated) of collecting data generated before, during, and after flight of the unmanned vehicle at a preset interval, encrypting the collected data, and storing the encrypted data.

Here, the unmanned vehicle monitoring method may further include the step (not illustrated) of performing location tracking, data encryption, and DDS-based user authentication through post-flight analysis, and then analyzing an accident using a data extraction function.

According to the embodiments described herein, the multi-functional data recording function may be provided in a form that not only a data recording function for accident investigation on the unmanned vehicle, but also an accident prevention function are combined.

According to the embodiments described herein, the accident investigation may be assisted by securing the data of the unmanned vehicle, even when the recording means inside the unmanned vehicle is damaged or lost.

According to the embodiments described herein, accurately identifying the causes of accidents may be assisted by verifying the accuracy of the flight data or whether the flight data stored in the unmanned vehicle is true.

According to the embodiments described herein, personal information or key data of national public institutions may be prevented from being leaked from data after an accident of the unmanned vehicle.

According to the embodiments described herein, it makes it possible to add various functions including the data recording function and the accident prevention function to the unmanned vehicle regardless of the structure, software, an interface method and the like.

Although the embodiments of the present disclosure have been disclosed with reference to the attached drawing, those skilled in the art will appreciate that the present disclosure can be implemented in other concrete forms, without changing the technical spirit or essential features of the disclosure. Therefore, it should be understood that the foregoing embodiments are merely exemplary, rather than restrictive, in all aspects.

11

What is claimed is:

1. An unmanned vehicle monitoring apparatus, comprising:
  a safety device including at least one of a parachute or an additional wing or a combination thereof; and
  a multi-functional data recording module configured to:
    monitor a flight state of an unmanned vehicle based on sensing information from at least one sensor configured to sense each of a GPS signal, an altitude, and a location,
    perform a control calculation for flight based on the sensing information,
    detect an anomaly using a result of the control calculation,
    control driving of the safety device according to an anomaly detection result, and
    record flight status data of the unmanned vehicle in a memory.

2. The unmanned vehicle monitoring apparatus of claim 1, wherein the multi-functional data recording module is configured such that a housing is attached to a portion of the unmanned vehicle and such that the housing includes an internal housing made of an electromagnetic interference shield material and an external housing made of a crash protection material.

3. The unmanned vehicle monitoring apparatus of claim 1, wherein the multi-functional data recording module is configured to, in detecting the anomaly, generate an emergency signal in case of occurrence of at least one of detection of a radio interference signal, detection of whether an operation value is lost, power shortage detection, Electronic Speed Controller (ESC) motor abnormality detection, body anomaly detection, heartbeat signal detection, failure detection including a watchdog signal, or crash detection through attitude control calculation, or a combination thereof, during flight.

4. The unmanned vehicle monitoring apparatus of claim 3, wherein:
  the multi-functional data recording module further comprises an RF unit,
  the emergency signal is transmitted to an external operator device through the RF unit according to an anomaly detecting result, and
  the safety device is driven in response to reception of an emergency operation command from the external operator device through the RF unit.

5. The unmanned vehicle monitoring apparatus of claim 4, wherein the multi-functional data recording module tracks a location of the unmanned vehicle to report the location to the operator device at a preset interval when the emergency operation command from the external operator device is not received through the RF unit.

6. The unmanned vehicle monitoring apparatus of claim 1, further comprising:
  a remote identification sensor configured to receive remote identification information broadcasted from at least one additional unmanned vehicle and input the remote identification information to the multi-functional data recording module.

7. The unmanned vehicle monitoring apparatus of claim 1, wherein the multi-functional data recording module collects data generated before, during, and after flight of the unmanned vehicle at a preset interval, encrypts the data, and stores the encrypted data in the memory.

8. The unmanned vehicle monitoring apparatus of claim 1, wherein the multi-functional data recording module performs location tracking, data encryption, and data distribution service (DDS)-based user authentication through post-flight analysis, and then analyzes an accident using a data extraction function.

9. The unmanned vehicle monitoring apparatus of claim 1, wherein the multi-functional data recording module comprises a relay circuit connected with wings of the unmanned vehicle to stop driving of the wings of the unmanned vehicle through the relay circuit upon generation of an emergency signal and to drive the safety device.

10. An unmanned vehicle monitoring method, comprising:
  monitoring a flight state of an unmanned vehicle based on sensing information from at least one sensor configured to sense each of a GPS signal, an altitude, and a location;
  performing control calculation for flight based on the sensing information;
  detecting an anomaly using a result of the control calculation;
  wirelessly transmitting an emergency signal to an external operator device according to an anomaly detection result;
  controlling driving of a safety device in response to reception of an emergency operation command from the external operator device; and
  reporting, to the external operator device, a landing state of the unmanned vehicle in response to detection of landing of the unmanned vehicle.

11. The unmanned vehicle monitoring method of claim 10, wherein the anomaly detection result comprises:
  detecting at least one of detection of a radio interference signal, detection of whether an operation value is lost, power shortage detection, ESC motor abnormality detection, body anomaly detection, heartbeat signal detection, failure detection including a watchdog signal, or crash detection through attitude control calculation, or a combination thereof, during flight.

12. The unmanned vehicle monitoring method of claim 10, further comprising:
  tracking a location of the unmanned vehicle to report the location to the operator device at a preset interval in response to determining that the emergency operation command from the external operator device is not received.

13. The unmanned vehicle monitoring method of claim 10, further comprising:
  receiving remote identification information broadcasted from at least one additional unmanned vehicle.

14. The unmanned vehicle monitoring method of claim 13, further comprising:
  collecting data generated before, during, and after flight of the unmanned vehicle at a preset interval, encrypting the data, and storing the encrypted data in a memory.

15. The unmanned vehicle monitoring method of claim 10, further comprising:
  performing location tracking, data encryption, and data distribution service (DDS)-based user authentication through post-flight analysis, and then analyzing an accident using a data extraction function.

16. The unmanned vehicle monitoring method of claim 10, wherein controlling driving of the safety device comprises:
  determining whether a relay circuit connected with wings of the unmanned vehicle is included, and stopping driving of the wings of the unmanned vehicle through the relay circuit based on a determination that the relay circuit is included and upon generation of the emergency signal.

\* \* \* \* \*